United States Patent [19]

Brown et al.

[11] Patent Number: 4,489,474
[45] Date of Patent: Dec. 25, 1984

[54] ASSEMBLING METHOD OF ROLLING LOBE AIRSPRING

[75] Inventors: Paul R. Brown, Tallmadge; Henry D. Fresch, Cuyahoga Falls, both of Ohio

[73] Assignee: The Goodyear Tire & Rubber Company, Akron, Ohio

[21] Appl. No.: 255,626

[22] Filed: Apr. 20, 1981

Related U.S. Application Data

[62] Division of Ser. No. 18,400, Mar. 8, 1979, abandoned.

[51] Int. Cl.³ .................... B21D 39/00; B23P 11/00
[52] U.S. Cl. ................................. 29/508; 29/445; 267/64.21; 267/64.24
[58] Field of Search ............... 29/508, 445, 516; 285/242, 252, 256, 259; 267/64.16, 64.24, 64.21, 65 B

[56] References Cited

U.S. PATENT DOCUMENTS

| | | | |
|---|---|---|---|
| 1,085,818 | 2/1914 | Oxnard | 267/64.24 |
| 3,038,717 | 6/1962 | Bank | 267/64.24 |
| 3,173,695 | 3/1965 | Brown | 29/445 X |
| 3,319,952 | 5/1967 | Travers | 267/64.27 |
| 3,321,823 | 5/1967 | Taplin | 29/445 X |
| 3,790,147 | 2/1974 | Owen | 267/64.21 |
| 3,819,166 | 6/1974 | Ellis et al. | 267/64.21 |
| 3,850,437 | 11/1974 | Owen | 267/64.21 X |
| 3,876,193 | 4/1975 | Clary | 267/65 B |
| 3,897,941 | 8/1975 | Hirtreiter et al. | 267/65 B |
| 4,034,460 | 7/1977 | Hulle et al. | 29/445 X |
| 4,398,704 | 8/1983 | Buchanan, Jr. | 267/64.21 |

*Primary Examiner*—Charlie T. Moon
*Attorney, Agent, or Firm*—R. D. Thompson

[57] ABSTRACT

A rolling lobe airspring of the type embodying a tubular flexible member of substantially uniform thickness throughout its length and circumference includes a modified piston. The piston includes a recess near its end which is secured to the flexible member. The end of the flexible member lies in the piston recess. A method of assembly of such an airspring is also described.

6 Claims, 8 Drawing Figures

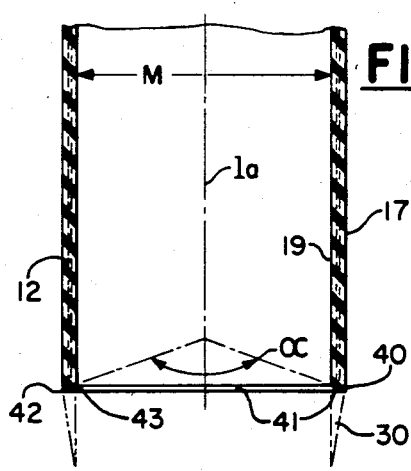
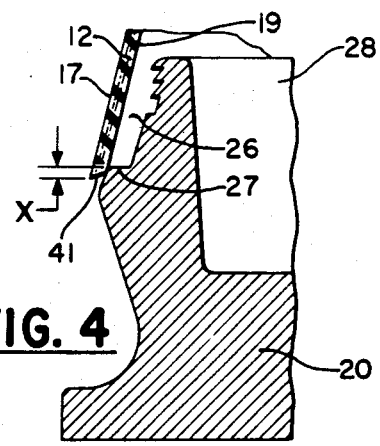
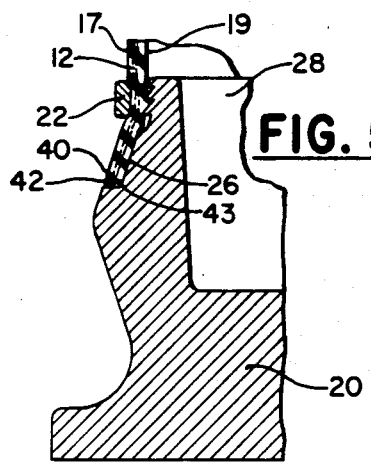
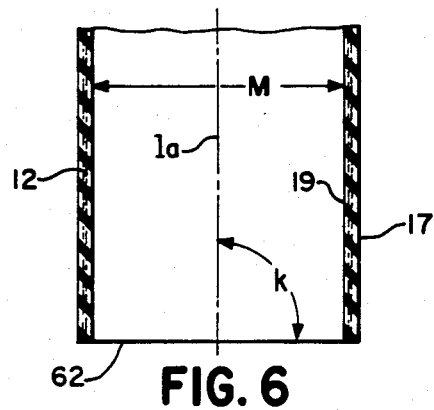
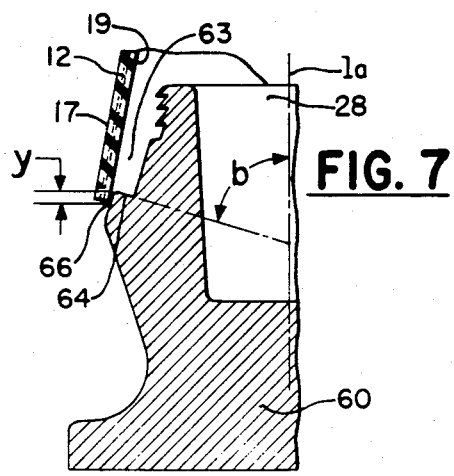
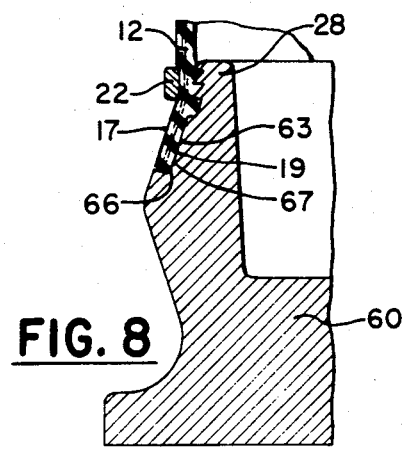

ASSEMBLING METHOD OF ROLLING LOBE AIRSPRING

This is a division of application Ser. No. 18,400 filed Mar. 8, 1979, now abandoned.

The foregoing abstract is not to be taken as limiting the invention of this application and in order to understand the full nature and extent of the technical disclosure of this application reference must be made to the accompanying drawings and the following detailed description.

BACKGROUND OF THE INVENTION

This invention generally relates to fluid springs such as pneumatic or airsprings, of the type used in fluid suspension systems. More particularly this invention relates to fluid springs of the type in which a piston moves within a flexible resilient member or sleeve to cause compression and expansion of the confined fluid. Such airsprings are commonly known as reversible sleeve or rolling lobe type airsprings as distinguished from bellows type airsprings.

In a rolling lobe type airspring at least one of the elements to which the flexible member is secured is a generally cylindrical piston usually made of metal or plastic and which is employed to cause compression and expansion of the fluid contained in the spring. When a load is applied axially (that is, in the lengthwise direction) of this type of spring the piston moves within the flexible member which reverses upon itself to form a rolling lobe which rolls over the piston. The resulting change in the configuration of the spring member consequently changes the pressure of the fluid contained in the chamber. The outer surface of the piston over which the lobe of the flexible member rolls as well as the rest of the components of the airspring are carefully engineered to provide the desired operating characteristics. Variation in the surface over which the rolling lobe travels during operation of the airspring results in undesired deviations from the air spring's design characteristics.

In known rolling lobe airsprings, the flexible tubular member comprises a generally cylindrical member of elastomeric material having reinforcements therein at least one end of the flexible member typically is of tapering thickness upon completion of the molding operation. When the flexible member is secured to the piston this tapered end may extend into the working area of the piston contour causing a noticeable and undesired change in the fine tuned characteristics of the airspring. Another problem with this known airspring design is that the rolling lobe of the flexible member may in service repeatedly roll over the tapered end portion of the flexible member which lies on the piston surface resulting in rubber reversion or chemical breakdown whose tacky nature may cause undesirable dirt and foreign material build-up on the piston working area. Such build-ups will change the airspring's characteristics and may reduce its service life.

It is an object of the invention to provide a rolling lobe airspring employing a tubular flexible member which substantially reduces or eliminates the possibility of variation from the design characteristics of the airspring.

It is another object of the invention to provide a tubular flexible member rolling lobe airspring in which the possibility of undesirable piston build-up to the rubber reversion or chemical breakdown is substantially reduced or eliminated.

SUMMARY OF THE INVENTION

In accordance with the present invention it has been discovered that the above objects and advantages are accomplished by a flexible tubular member of substantially even thickness throughout its length and circumference which is sealed in airtight manner at its two axially distant ends. At least end one of the member is attached to a piston. The opposite end of the flexible member may be attached to a piston or to a plug. The piston includes a circumferential recess of a depth corresponding approximately to the thickness of the flexible member. The recess is located adjacent the end of the piston which is inserted in and secured to the flexible member. Preferably, the ends of the flexible member are secured by means of ring-shaped fittings. The piston end of the flexible member lies in the recess of the piston and preferably substantially fills the recess.

BRIEF DESCRIPTION OF THE DRAWINGS

In the drawings:

FIGS. 3 and 6 respectively, are fragmentary elevational views in section of the flexible tubular member having an end differently formed according to the invention;

FIGS. 4 and 7 respectively, are fragmentary elevational views in section illustrating an intermediate step in the assembly of different embodiments of an airspring according to the invention;

FIGS. 5 and 8 respectively, are fragmentary elevational views in section illustrating different embodiments of airsprings according the the invention.

DETAILED DESCRIPTION OF THE INVENTION

Figures 1, 2:
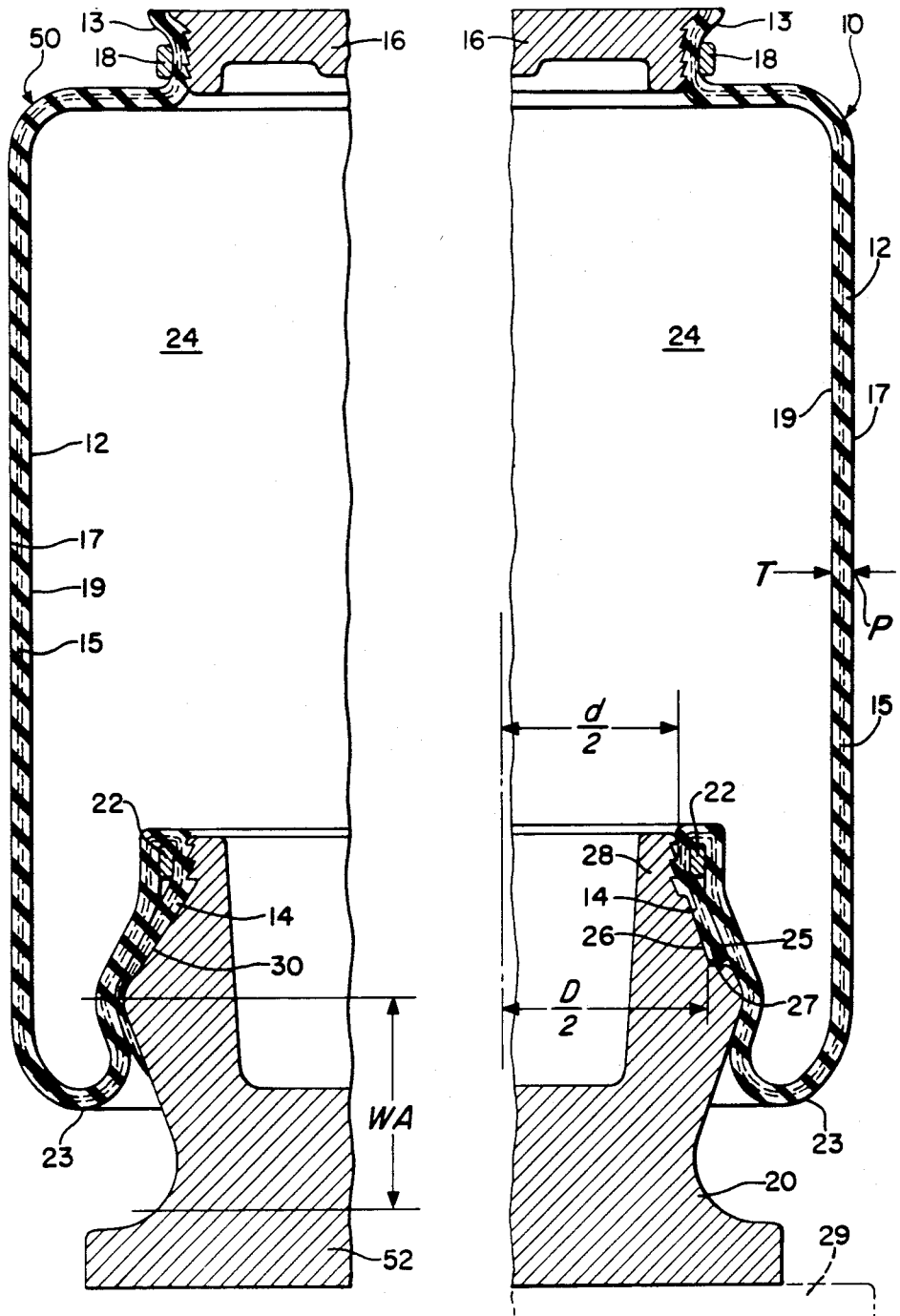
FIG. 1 is an elevational view in section showing the left half of a tubular rolling lobe type airspring according to the prior art, the airspring being substantially symmetrical about its longitudinal axis.
FIG. 2 is an elevational view in section showing the right half of a tubular rolling lobe type airspring according to the invention, the airspring being substantially symmetrical about its longitudinal axis.

Referring to FIG. 2, the airspring 10 of the invention is shown in its inflated condition. The flexible generally tubular member 12 is secured at one end 13 to a plug 16 by means of a ring-shaped fitting 18. The axially opposite end 14 of the flexible member 12 is secured to a piston 20 by a similar ring-shaped fitting 22. There is formed between the plug 16, the piston 20 and the tubular flexible member 12 a sealed chamber 24 for containment of the inflation fluid, for example, pressurized air. The flexible member 12 is composed of flexible polymeric material such as natural or synthetic rubber or other elastomeric material and usually contains tension-resisting reinforcements 15 therein. The flexible member 12 in its undeformed state, as manufactured (not illustrated) is of a generally cylindrical configuration and typically includes at least one end portion 30 of tapering thickness (as shown in FIG. 1). The flexible member 12 as manufactured is of substantially equal thickness (T) throughout its axial dimension and its circumference except for its ends, which may be tapered. The flexible member 12 does not contain beads at its ends.

As used herein, thickness of the member is the shortest distance from a chosen point of interest on the outer surface 17 of the flexible member to the inner-surface of the flexible member 19. Referring to FIG. 2, the thickness (T) of the flexible member 12 is shown at point P which lies on the outer surface of the member.

When used in the airspring 10 of the invention the tapered end portion 30 (as illustrated in FIG. 1) of the member 12 is cut off or otherwise formed in a manner to be hereinafter fully described.

The plug 16 shown is of conventional design and therefore will not be further discussed.

The piston 20 in an airspring 10 according to the invention includes a circumferentially extending recess 26 adjacent the end 28 of the piston 20 which is opposite the part 29 to which the piston 20 is mounted. In other words the recess 26 is adjacent the end 28 of the piston which enters the flexible member 12 upon insertion of the piston 20 into the flexible member 12. The recess 26 is preferably of a depth corresponding approximately to the thickness of the flexible member 12 with due allowance for the compression of the flexible member 12 which occurs under load. This allowance may range from about 5 to 20 percent and is preferably about 10 percent of the thickness of the flexible member 12. It is important that any discontinuity existing in the surface of the piston 20 and end 25 of the flexible member over which the lobe 23 rolls be minimal as such discontinuities will alter the spring's characteristics and may reduce the life of the flexible member 12. Preferably no discontinuity exists in the surface of the piston 20 and end 25 of the flexible member 12 over which lobe 23 rolls. In the embodiment shown in FIG. 2 the recess 26 is in the configuration of a frustum of a cone. However, this need not be the case. As another example, the recess could be of substantially cylindrical configuration (not shown) depending upon the desired characteristics of the spring. These examples are not intended to limit the invention. When the recess 26 is in the configuration of a conical frustum as shown in FIG. 2 it is preferable that the diameter D of the piston 20 at the end 27 of the recess 26 which is nearest the part 29 to which the piston 20 is mounted be of a diameter approximately corresponding to the inside diameter (M) of the flexible member as manufactured (refer to FIGS. 3 or 6). Such relationship between the maximum diameter of the recess and the inside diameter (M) of the flexible member reduces or eliminates flaring of the piston end 14 of the flexible member 12 outwardly from the piston 20. The end 27 of the recess 26 may be near the end 28 of the piston 20 and immediate the ring-shaped fitting 22. In a preferred embodiment, similar to that shown in FIG. 2 (see also FIGS. 5 and 8), the end 27 of the recess 26 is distal the end 28 of the piston an amount such that the end 14 of the flexible member 12 extends at least three millimeters (one eighth of an inch) beyond where it is secured to the piston end 28 by ring-shaped fitting 22. The cut end 14 of the flexible member 12 preferably should not be extended into the working area (WA) of the piston surface.

The diameter (d) of the end of the piston at the point of attachment of the ring-shaped fitting 22 which secures the flexible member 12 to the piston 20 is preferably of a diameter (d) only slightly smaller than that of the inside diameter (M) of the undeformed flexible member 12 (refer to FIGS. 2 and 3). Such configuration reduces pull back and flaring of the flexible member 12 from the end 27 of the recess 26 upon attachment of the retaining ring-shaped fitting 22. The outside diameter (d) of the piston at the location of the ring fitting may be from about 75 percent to about 95 percent of the inside diameter of the undeformed flexible member 12 and is preferably at least 90 percent of the inside diameter of the undeformed flexible member 12 and most preferably is about 95 percent of the inside diameter of the undeformed flexible member 12.

Referring to FIG. 1 there is shown an airspring 50 according to the prior art. In such an assembly it is common for the tapered end portion 30 of the flexible member 12 to extend down into the working area (WA) of the surface of the piston 52. As a result the tapered end portion 30 adds to the circumference of the piston 52 thus changing the airspring's fine tuned characteristics. Because both the thickness and the length of the tapered end portion 30 extending into the working area (WA) of the piston surface can vary from one assembly to another, it is difficult, if not impossible, to allow for the contribution of tapered end portion 30 to the piston's 52 overall dimensions. As used herein, the working area (WA) is that area of the piston surface over which the rolling lobe 23 of the flexible member 12 travels and resides during a majority of the airspring's operation when operated in accordance with design inflation, load and input variations.

One preferred method of assembly of the airspring 10 of the invention begins by co-axially aligning the piston 20 with the flexible member 12 and then inserting the end 28 of the piston 20 into the member 12 so that the tapered portion end (not shown in FIG. 2 but similar to portion 30 of FIG. 1) of the member 12 extends beyond the end 27 of the recess 26 and over at least part of the working area of the piston 20. The flexible member 12 is then secured to the end of the piston 20 as by a ring-shaped fitting 22 which, by way of example only, may be a compression ring or a swaged ring. Such rings are typically of a metal composition, for example, brass or aluminum. The tapered end portion 30 of the flexible member 12 is then trimmed off at a point corresponding to the end 27 of the recess 26 which is distal the piston ring-shaped fitting 22 so that the member 12 substantially fills the recess 26.

The trimming operation (not illustrated) is conveniently done with a lathe. The piston 20 with the flexible member 12 secured thereto is chucked into the lathe and the excess of the flexible member 12 including its tapered end portion 30 is cut away at a point corresponding to the end 27 of the recess 26 which is distal the piston ring-shaped fitting 22.

The flexible member may have its tapered end portion 30 cut off prior to insertion of the piston into the flexible member's however, in this instance application of the retaining ring-shaped fitting 22 to secure the flexible member 12 to the piston 20 may result in pull back of the cut end 25 of the flexible member from the end 27 of the recess 26 which is distant from the piston ring-shaped fitting 22 if allowance is not made for this phenomenon. The resulting gap (not shown) between the end 25 of the member 12 and the end 27 of the recess 26 is undesirable since in operation when full rebound of the airspring occurs the rolling lobe 23 must pass over the recessed area of the piston 20. As discussed previously herein, such discontinuities are undesirable.

According to the invention, another method of avoiding or minimizing any gap between the trimmed end 40 of the flexible member 12 and the end 27 of the recess 26 is illustrated in FIGS. 3-5. Referring to FIG.

3, the tapered end portion 30 of the flexible member has been trimmed away at an angle less than ninety (90) degrees to the longitudinal axis (1a) of the flexible member 12 so as to form an inside chamfer 41. The included angle ($a$) of the sides of the chamfer 41 is, of course, less than one hundred eighty (180) degrees, and preferably ranges from about 170 to 90 degrees and, most preferably from about 170 to 130 degrees. Of course, the flexible member 12 could be formed, as by molding, with such a chamfered end. After trimming away of the end of the flexible member to form an end 40 having an inside chamfer 41 as shown in FIG. 3, the chamfered end 40 of the flexible member 12 is coaxially aligned with and positioned over the end of the piston 20 such that a predetermined amount of the flexible member 12 extends beyond the end 27 of the recess 26 which is distal the end 28 of the piston 20 to which the flexible member 12 is secured. This amount, shown as distance x in FIG. 4, is chosen so that when the ring-shaped fitting 22 is applied, the chamfered end 40 of the flexible member 12 is thereby pulled back toward the ring-shaped fitting 22 and drops into the recess 26 without leaving any substantial gap. The clamping action of the ring-shaped fitting 22, particularly when a swaged ring is employed, causes the acutely pointed tip 42 of the chamfered end 40 of the flexible member 12 to be drawn toward the ring-shaped fitting 22 a greater amount than the obtusely angled radially inner tip 43 of the chamfered end 40 of the flexible member 12. Upon application of the ring-shaped fitting 22 the chamfered end 40 of the flexible member 12 flares slightly radially outwardly and at the same time is drawn toward the ring-shaped fitting 22, thus allowing the chamfered end 40 to drop into and substantially fill the recess 26.

According to the invention, yet another method of assembling a flexible member 12 having a preformed or pre-trimmed end to the piston without any substantial gap is shown is FIGS. 6-8. As shown in FIG. 6, the end 62 of the flexible member 12 which is to be secured to the piston 60 is first formed, as by trimming or molding, for example, substantially square, that is, at an angle (k) of about ninety (90) degrees relative to the longitudinal axis (1a) of the undeformed flexible member 12. As shown in FIG. 7, the square-formed end 62 of the flexible member 12 is then coaxially aligned with and positioned over the end of the piston 60 a predetermined amount such that the end of the flexible member 12 extends beyond the end 64 of the recess 63 a predetermined amount (y). Upon application of the ring-shaped fitting 22, particularly when a swaged ring is employed, the square cut leading edge 66 of the flexible member 12 is drawn back toward the ring-shaped fitting 22 and seats along the base 67 of the recess 63. As in the assembly of FIG. 5, the outer surface 17 of the flexible member is drawn toward the ring-shaped fitting a greater amount than the inner surface 19 of the flexible member 12. The approximately perpendicularly formed end of the flexible member 12 drops into and substantially fills the recess 63 upon application of the ring-shaped fitting 22. Note that the end of the recess is not perpendicular to the longitudinal axis or axial centerline of the piston as in the embodiment of FIGS. 2 and 5, but rather, is at angle (b), which preferably is from about 85 to 65 degrees relative to the longitudinal axis of the piston.

While certain representative embodiments and details have been shown for the purpose of illustrating the invention it will be apparent to those skilled in the art that various changes and modifications may be made therein without departing from the spirit or the scope of the invention.

We claim:

1. A method of assembling a rolling lobe fluid spring from at least the following components:
   a mounting member;
   a piston having a radially extending mounting end, and an axially and circumferentially extending piston surface, a circumferentially extending working area axially away from the piston mounting end and a circumferentially extending recess between the mounting end and the working area, the recess having a circumferentially extending blunt end axially adjacent the working area and axially away from the mounting end; and
   a flexible, tubular member having a first end and a second end with a leading edge, the tubular member being of substantially uniform thickness throughout the second end to the leading edge, such that the second end is a taper free, blunt end, and the leading edge is a blunt leading edge;
   the method of assembly comprising:
   mounting and securing the first end of the tubular member in a fluid tight manner to the mounting member; and
   mounting and securing the second end of the tubular member to the piston in a fluid tight manner about the piston, (a) such that a circumferentially extending area of securement is defined in the second end of the tubular member, (b) such that a rolling lobe is formed in the tubular member between the area of securement and the first end of the tubular member which extends longitudinally, past the piston recess to the working area, and (c) such that a non-tapered, blunt tail including the blunt leading edge is formed in the second end of the tubular member, with the blunt tail extending from the securement area in a direction within the tubular member away from the rolling lobe and first end, the blunt tail being in the recess and thereby being between the rolling lobe and piston, and the blunt tail substantially filling the recess both axially and radially such that the blunt leading edge of the tail lies at the blunt end of the recess without a substantial gap between the blunt leading edge and blunt end of the recess, and further such that the tail has a radially outer surface which, with the working area, presents a substantially continuous surface over which the rolling lobe may roll.

2. A method of assembling a rolling lobe fluid spring as in claim 1 in which the recess of the piston surface is frustoconical, and in which the mounting and securing of the second end of the tubular member to the piston is adapted such that the blunt tail at the blunt leading edge of the tubular member is substantially tension free, whereby the blunt tail does not flare outwardly from the piston.

3. A method of assembling a rolling lobe fluid spring as in claim 1 in which the mounting and securing of the second end of the tubular member to the piston comprises mounting and securing the tubular member to the piston with a ring fitting in the area of securement, such that the ring fitting compresses the tubular member in the area of securement by a diametric amount in the range of about 5 percent to about 25 percent.

4. A method of assembling a rolling lobe fluid spring as in claim 1, the step of mounting and securing the second end of the tubular member to the piston being accomplished by inserting the piston into the second end of the tubular member such that the second end of the tubular member extends beyond and entirely covers the recess, then securing the second end of the tubular member to the piston, and then cutting off a portion of the second end of the tubular member adjacent the blunt tail.

5. A method of assembling a rolling lobe fluid spring as in claim 1, the step of mounting and securing the second end of the tubular member to the piston being accomplished by inserting the piston into the second end of the tubular member such that the second end of the tubular member extends beyond and entirely covers the recess, then securing the second end of the tubular member to the piston such that the second end is drawn back from extending beyond the recess, and such that the second end drops into and substantially fills the recess.

6. A method of assembling a rolling lobe fluid spring as in claim 5, further comprising, before the second end of the tubular member is mounted and secured to the piston:

forming the second end of the tubular member to have a chamfered end with an inside chamfer and with sides which form an included angle of not greater than about 170 degrees and not less than about 90 degrees;

the inserting of the piston into the second end of the tubular member being accomplished such that the chamfered end extends beyond and entirely covers the recess, and the securing of the second end of the tubular member to the piston being accomplished such that the chamfered end is drawn back from extending beyond the recess, drops into and substantially fills the recess.

* * * * *